Patented Dec. 27, 1938

2,141,911

UNITED STATES PATENT OFFICE 2,141,911

LACQUER ENAMEL

Richard Karl Hazen, Montclair, N. J., assignor to Egyptian Lacquer Manufacturing Company, a corporation of New Jersey No Drawing. Application August 12, 1936, Serial No. 95,635

6 Claims. (Cl. 91—70)

This invention relates to lacquer enamels and particularly to lacquer enamels containing nitrostarch. More specifically the invention contemplates the production of a nitrostarch lacquer enamel of spraying viscosity that contains a high proportion of non-volatile ingredients and a correspondingly low proportion of solvent or solvent mixture and that will form a hard dry film when baked.

In order to apply a lacquer enamel by spraying, its viscosity must be relatively low, say from 60 to 110 centipoises at the temperature of application. It is desirable that the lacquer enamel also contain a high proportion of non-volatile ingredients and a correspondingly low proportion of volatile ingredients such as solvents and solvent mixtures, because the higher is the proportion of non-volatile ingredients the thicker will be the film obtainable per spray application and the lower will be the consumption of solvent or solvent mixture in the production of a film of given thickness. In other words, an increase in the proportion of non-volatile ingredients in a lacquer enamel is conducive to economies in the solvent or solvent mixture consumption, in the labor involved in applying the lacquer enamel and handling the enameled articles between coats, in the amount of storage space provided for articles in process, and in the capital invested in the articles in process.

In the heretofore customary practice it has not been possible to produce a satisfactory lacquer enamel of spraying viscosity (say 60 to 110 centipoises at room temperature) which contained more than about 17 to 20% by weight of non-volatile constituents. Such a lacquer enamel will seldom produce a coat of satisfactory thickness in a single spray application and it has been customary to apply from two to four spray coats.

As a result of my investigations I have discovered a lacquer enamel which will have a viscosity suitable for spraying even when its content of non-volatile ingredients is as high as 50% by weight of the enamel, or about three times the proportion present in the lacquer enamels of spraying viscosity in the heretofore customary art. This lacquer enamel will produce a coat of satisfactory thickness for almost any purpose in a single spray application and is capable of forming a hard dry lustrous film upon baking. It contains a solvent mixture and non-volatile ingredients comprising a pigment, nitrostarch and a resin. The amount of nitrostarch present preferably ranges from 25 to 35% by weight of the total non-volatile ingredients in the enamel. The amount of resin present ranges from 160 to 180% by weight of the nitrostarch.

Throughout the specification and the appended claims I use the term "non-volatile ingredient" to describe those constituents of the enamel such as pigments, nitrostarch, plasticizers, softeners and resins which remain after the solvent or solvent mixture has evaporated, and form the dried enamel film.

The term "solvent" is used here to mean a readily volatile liquid which will dissolve nitrostarch or a resin, or both, and which will evaporate from an enamel film at room temperature, leaving the non-volatile ingredients as a continuous uniform film.

The term "solvent mixture" is used to include true solvents for nitrostarch or for a resin or for both, with or without liquid diluents and latent solvents which by themselves will not dissolve nitrostarch or a resin, but when added in limited amount to a solution of nitrostarch or of resin or of both will dilute the solution without causing precipitation of the nitrostarch or the resin.

I use the term "plasticizer" to describe those ingredients in enamels which are true solvents for nitrostarch and which are added to impart flexibility and overcome brittleness in the final dried film. The plasticizer remains in a dried enamel film formed at room temperature or thereabouts, but does not itself have film forming characteristics. Examples of such plasticizers are dibutyl phthalate, tricresyl phosphate and triacetin. As used here the term "plasticizer" does not include such substances as castor oil and blown Chinawood oil which remain in dried enamel films formed at room temperature, imparting flexibility thereto and overcoming brittleness therein, but which are not true solvents for nitrostarch. Such substances are classified herein as "softeners".

The term "resin" as used here, defines those amorphous substances, both natural and artificial, which have inherent film forming characteristics and are exemplified by dammar gum, copal, ester gum, oil-acid modified alkyd resins, shellac, hydrogenated or unhydrogenated alkyl or aralkyl esters of abietic acid, unmodified phenol formaldehyde, and the like.

The nitrostarch employed preferably should contain about 13.2% nitrogen. Nitrostarch of this character has a low viscosity characteristic and is particularly suitable in enamels, i. e., in coating compositions which contain pigments and which form a dry film due to evaporation of a volatile ingredient instead of by chemical action such as the oxidation which causes film formation in the case of paints, etc.

I have found that the amount and proportion of ingredients in a "baking" nitrostarch lacquer enamel should be entirely different than in nitrostarch lacquer enamels which form a hard coat by drying in the air at room temperatures in a relatively short time, say one-half hour, and also different from the kind, amount, and proportion of ingredients in nitrostarch lacquers which contain little or no pigment. Thus I have found that the nitrostarch content of the "baking" lacquer enamel should range from about 25 to about 35% of the non-volatile ingredients in the enamel, and that for best results the nitrostarch should be accompanied by a large proportion of resin, say 160 to 180% by weight of the nitrostarch.

The number and variety of resins which form satisfactory films when employed in a lacquer enamel in the aforementioned proportions with nitrostarch are very great. Thus the alkyd resins, the phenol formaldehydes, alkyl abietates, glycol sebacates, etc., may be employed in the aforementioned proportions and give satisfactory results. However, I have found that superior coatings are formed when the resin which accompanies the nitrostarch has a softening point ranging between 35° C. and 66° C. as determined by the ball and ring test described by Henry A. Gardiner, in "Physical and Chemical Examination of Paint, Varnishes, Lacquers and Colors", Fifth edition (October, 1930) pages 501 to 504. Reference should be made to this publication for a full description of the technique involved in making the test. Briefly, the test comprises melting the resin, or the like, which is to be tested and pouring it into a brass ring laid on a horizontal plate. The ring should be poured full and the excess cut off the top ring surface after the resin has cooled. The filled ring is taken as the sample. The ring should have an inside diameter at the bottom of ⅝ inch, an inside diameter at the top of 1⅛ inch, and a depth of ¼ inch. After the sample has been prepared it is placed in a horizontal position in a bath of liquid which has a temperature considerably below the softening point of the sample. The ring should be supported so that the slug of resin inside it can fall out when it becomes loose. A ⅜ inch ball, such as a steel ball bearing weighing about 3.5 grams, is placed on top of the resin in the ring and the temperature of the bath is thereafter raised uniformly at a rate of about 5° C. per minute. A thermometer is placed in the bath. The softening point is taken as the temperature of the bath at the moment when the resin sample frees itself from the ring and falls to the bottom of the bath.

Among the resins having a softening point ranging from 35° C. to 66° C., and which I have found particularly suitable are included castor oil derivatives such as "Paraplex RG2, RG5 and RG20", pure or modified alkyd resins such as "Becksol 1308, 1324, and 1316" unmodified phenolic resins such as "Bakelite XR3180", and unmodified alkyd resins from dibasic acids of terpene origin such as "Petrex 6".

While I have found that small amounts of plasticizers and softeners may be employed in the practice of my invention, the best results were obtained when the baking lacquer enamel contained no substantial amounts of either softener or plasticizer. The presence of either in excess of say 15% by weight of the non-volatile ingredients in the enamel tends to impair the character of the final baked lacquer enamel film by making it tacky. Moreover, many plasticizers and softeners which remain in a film formed by air drying at ordinary temperatures, tend to volatilize at least in part at baking temperatures, so that in general their use is wasteful.

Any suitable pigment, such as those heretofore employed in the manufacture of nitrocellulose enamels, may be incorporated into the enamel of my invention. Except in the case of black pigments, the amount of pigment employed should range from about 35 to about 55% by weight of the nitrostarch. When black pigments are employed the amount used should be considerably less, say from 5 to 10% by weight of the nitrostarch. The particle size of the pigments is in no way different from those of pigments heretofore employed in the manufacture of nitrocellulose lacquer enamels.

A great variety of solvents and solvent mixtures may be employed. It is essential, of course, that the ingredients in the solvent mixture be capable of holding nitrostarch and resin in solution, and that they do not impart too great a degree of viscosity to the enamel.

An enamel of spraying viscosity made in accordance with my invention should preferably contain from 40 to 50% by weight of non-volatile ingredients. It is possible, of course, but not economically desirable, to employ a lower proportion of non-volatile ingredients.

The process of forming a nitrostarch lacquer enamel film in accordance with my invention comprises making a mixture of pigment, nitrostarch, resin and a suitable solvent or solvent mixture such that 25 to 35% of the non-volatile ingredients is nitrostarch, with about 160 to 180% of resin on the weight of the nitrostarch. The mixture, even containing as much as 50% of non-volatile ingredients by weight, will have a viscosity suitable for spray application. The mixture is applied to a surface, preferably metal, by spraying. After a short drying period, say 5 to 30 minutes, in air at room temperature, the sprayed surface is baked at an elevated temperature, say 175° F. to 290° F., for a time ranging from 30 to 120 minutes.

Lacquer enamels made in accordance with the practice described herein are not recommended for use when the enameled surface must be dried in air at room temperature a short time because air-drying is slow and does not permit the formation of a hard film. Moreover, during the long drying period dust or other extraneous matter may settle on the still tacky film and spoil its appearance. Nitrostarch lacquer enamels which will dry quickly at room temperature must be formulated in accordance with other principles, as described in my co-pending application, Serial No. 95,634, filed August 12, 1936.

My invention will be thoroughly understood in the light of the following formula, which is intended to be illustrative and not restrictive:

FORMULA

*Nitrostarch baking enamel*

Composition of non-volatile ingredient:

| | Percent by weight |
|---|---|
| Nitrostarch (13.2% nitrogen) | 31.3 |
| Resin—"Glyptal 1247", oil-acid modified alkyd resin (softening point by ring and ball method 40–66° C.) | 53.0 |
| Pigment—iron oxide | 15.7 |
| Total | 100.0 |

Ratio of nitrostarch content to resin content, 100 to 160–180.

Ration of nitrostarch content to pigment content, 100 to ±50.

Composition of solvent mixture:

| | Percent by weight |
|---|---|
| Denatured ethyl alcohol | 6 |
| Ethyl acetate | 5 |
| Butyl alcohol | 9 |
| Butyl acetate | 35 |
| Toluol | 25 |
| Xylol | 20 |
| Total | 100 |

Composition of enamel, total non-volatile ingredients and total solvent mixture:

| | Percent by weight |
|---|---|
| Non-volatile ingredient | 43.1 |
| Solvent mixture | 56.9 |
| Total | 100.0 |

No special equipment or procedure is necessary in the preparation of the enamel of my invention. The enamel exemplified by the foregoing formula was prepared by separately dissolving the resin and the nitrostarch in appropriate portions of the solvents. The pigment was dispersed in the nitrostarch solution. It was then combined with resin solution. The balance of the solvent mixture was then added and the lot was thoroughly mixed.

The finished enamel containing about 43% of non-volatile ingredients by weight had a viscosity of about 75 centipoises at 25° C. It was applied by spraying and formed a coat of adequate thickness in a single application. The wet coat was air dried for about 10 minutes and was thereafter baked for one hour at a temperature of 250° F. After baking, the coat had formed a hard dry film which was very adherent to metal surfaces and presented an attractive appearance.

I claim:

1. A lacquer enamel capable of forming a hard dry film upon baking and containing a solvent mixture and non-volatile ingredients including a pigment, nitrostarch and resin of the group consisting of oil-acid modified alkyd resin, castor oil derivatives, alkyd resins, unmodified phenolic resins and unmodified alkyd resins from dibasic acids of terpene origin, said resin having a softening point ranging from 35° C. to 66° C. as determined by the ring and ball method, the amount of nitrostarch present ranging from 25 to 35% by weight of the non-volatile ingredients and the amount of resin present ranging from 160 to 180% by weight of the nitrostarch.

2. A lacquer enamel capable of forming a hard dry film upon baking and containing a solvent mixture and nonvolatile ingredients including a pigment, nitrostarch and an oil acid modified alkyd resin having a softening point ranging from 35° C. to 66° C. as determined by the ring and ball method, the amount of nitrostarch present ranging from 25 to 35% by weight of the non-volatile ingredients and the amount of resin present ranging from 160 to 180% by weight of the nitrostarch.

3. A method of forming a hard dry film on a surface which comprises mixing together a solvent mixture and non-volatile ingredients including pigment, nitrostarch and resin of the group consisting of oil-acid modified alkyd resin, castor oil derivatives, alkyd resins, unmodified phenolic resins and unmodified alkyd resins from dibasic acids of terpene origin, said resin having a softening point ranging from 35° C. to 66° C. by the ring and ball method, said ingredients being present in such proportions that 25 to 35% of the non-volatile ingredients in the mixture is nitrostarch and that 160 to 180% of resin on the weight of the nitrostarch is present in the mixture, spraying the mixture on a surface, and baking the surface at a temperature in excess of 175° F.

4. A method of forming a hard dry film on a surface which comprises incorporating into an enamel a solvent mixture and non-volatile ingredients including pigment, nitrostarch and an oil-acid modified alkyd resin having a softening point ranging from 35° C. to 66° C. as determined by the ring and ball method, said ingredients being present in such proportions that the nitrostarch amounts to from 25 to 35% of the weight of non-volatile ingredients in the enamel and the resin amounts to from 160 to 180% of the weight of the nitrostarch, the total non-volatile ingredients in the enamel amounting to at least 40% of its total weight, spraying the resulting enamel onto the surface and baking the sprayed surface at a temperature in excess of 175° F.

5. A lacquer enamel capable of forming a hard dry film upon baking and containing a solvent mixture and non-volatile ingredients including a pigment, nitrostarch and unmodified phenolic resin having a softening point ranging from 35° C. to 66° C. as determined by the ring and ball method, the amount of nitrostarch present ranging from 25 to 35% by weight of the non-volatile ingredients and the amount of resin present ranging from 160 to 180% by weight of the nitrostarch.

6. A lacquer enamel capable of forming a hard dry film upon baking and containing a solvent mixture and non-volatile ingredients including a pigment, nitrostarch and an unmodified alkyd resin from a dibasic acid of terpene origin having a softening point ranging from 35° C. to 66° C. as determined by the ring and ball method, the amount of nitrostarch present ranging from 25 to 35% by weight of the non-volatile ingredients and the amount of resin present ranging from 160 to 180% by weight of the nitrostarch.

RICHARD KARL HAZEN.